(12) United States Patent
Jokiranta et al.

(10) Patent No.: US 10,036,121 B2
(45) Date of Patent: Jul. 31, 2018

(54) METHOD AND APPARATUS FOR CONTINUOUS MANUFACTURE OF SURFACE SIZING STARCH, WET-END STARCH OR BINDER STARCH IN PAPER, CARDBOARD AND CHEMICAL PULP INDUSTRY

(71) Applicant: ADPAP OY, Turku (FI)

(72) Inventors: Petri Jokiranta, Naantali (FI); Ari Murronmaa, Valkeakoski (FI)

(73) Assignee: ADPAP OY, Turku (FI)

(*) Notice: Subject to any disclaimer, the term of this patent is extended or adjusted under 35 U.S.C. 154(b) by 69 days.

(21) Appl. No.: 15/036,236

(22) PCT Filed: Nov. 17, 2014

(86) PCT No.: PCT/FI2014/050867
§ 371 (c)(1),
(2) Date: May 12, 2016

(87) PCT Pub. No.: WO2015/071550
PCT Pub. Date: May 21, 2015

(65) Prior Publication Data
US 2016/0281299 A1 Sep. 29, 2016

(30) Foreign Application Priority Data
Nov. 15, 2013 (FI) .................... 20136127

(51) Int. Cl.
*D21H 17/28* (2006.01)
*C08B 30/12* (2006.01)
(Continued)

(52) U.S. Cl.
CPC ............. *D21H 17/28* (2013.01); *B01J 19/10* (2013.01); *C08B 30/12* (2013.01); *C09D 103/02* (2013.01);
(Continued)

(58) Field of Classification Search
None
See application file for complete search history.

(56) References Cited

U.S. PATENT DOCUMENTS

| | | | | |
|---|---|---|---|---|
| 4,260,642 A | * | 4/1981 | Mitchell | C08B 30/14 127/71 |
| 4,469,524 A | * | 9/1984 | Assarsson | C08B 30/16 127/1 |
| 2009/0139676 A1 | | 6/2009 | Todorovic et al. | |
| 2011/0300394 A1 | * | 12/2011 | Welsch | C08B 30/02 428/532 |

FOREIGN PATENT DOCUMENTS

| DE | 35 30770 | 3/1987 |
|---|---|---|
| EP | 0 032 296 | 7/1981 |
| WO | WO 2008/029311 | 3/2008 |

OTHER PUBLICATIONS

Lomboy et al, Ultrasonic pretreatment of corn slurry in batch and continuous systems, 2009.*

(Continued)

*Primary Examiner* — Melvin C. Mayes
*Assistant Examiner* — Stefanie J Cohen
(74) *Attorney, Agent, or Firm* — Nixon & Vanderhye P.C.

(57) ABSTRACT

The invention relates to a method and apparatus for continuous manufacture of surface sizing starch, wet-end starch or binder starch in paper, cardboard and chemical pulp industry. The starch slurry is modified as a starch size suitable for the application (6) by exposing the starch slurry to ultra sound in the ultrasonic unit (4, 4a, 4b).

26 Claims, 3 Drawing Sheets

(51) Int. Cl.
  *D21H 23/76* (2006.01)
  *D21H 23/78* (2006.01)
  *D21H 21/16* (2006.01)
  *C09D 103/02* (2006.01)
  *B01J 19/10* (2006.01)
  *D21H 17/24* (2006.01)

(52) U.S. Cl.
  CPC ............ *D21H 17/24* (2013.01); *D21H 21/16* (2013.01); *D21H 23/76* (2013.01); *D21H 23/78* (2013.01); *B01J 2219/0871* (2013.01); *B01J 2219/0877* (2013.01)

(56) References Cited

OTHER PUBLICATIONS

International Search Report and Written Opinion of the ISA for PCT/FI2014/050867, dated Mar. 23, 2015, 11 pages.
Search Report for FI 20136127, dated Jul. 9, 2014, 1 page.
Database WPI, Week 201107, Thomson Scientific, AN 2010-Q30162, XP 002737123—CN 101 886 356, Nov. 11, 2010, 2 pages.
Database WPI, Week 201377, Thomson Scientific, AN 2013-V23731, XP002737124—CN 103 266 541, Aug. 28, 2013, 2 pages.
Database WPI, Week 200880, Thomson Scientific, AN 2008-N74794, XP002737125—JP 2008-248082, Oct. 16, 2008, 3 pages.

\* cited by examiner

METHOD AND APPARATUS FOR CONTINUOUS MANUFACTURE OF SURFACE SIZING STARCH, WET-END STARCH OR BINDER STARCH IN PAPER, CARDBOARD AND CHEMICAL PULP INDUSTRY

This application is the U.S. national phase of International Application No. PCT/FI2014/050867 filed 17 Nov. 2014, which designated the U.S. and claims priority to FI Patent Application No. 20136127 filed 15 Nov. 2013, the entire contents of each of which are hereby incorporated by reference.

TECHNICAL FIELD OF THE INVENTION

The invention relates to a method and apparatus for continuous manufacture of surface sizing starch, wet-end starch or binder starch in paper, cardboard and chemical pulp industry in accordance with the preambles of the independent claims presented below. The invention relates especially to a new way of processing the starch mix functioning as a raw material.

PRIOR ART

Nowadays the modified, i.e. converted surface sizing starch, wet-end starch and the binder starch, is cooked as a starch size typically in cooking processes, in which the starch slurry is cooked with steam either batchwise in a container or in a continuous cooking process with so-called jet cookers. The starch must be converted due to the high viscosity of the raw starch. The conversion refers in this case to the reduction of the viscosity by degrading the starch molecule chains for example by oxidizers or enzymes.

OBJECT OF THE INVENTION

The object of the present invention is to reduce or even eliminate the above-mentioned problems appearing in prior art.

An object of the present invention is to be able to manufacture the starch slurry as an end product corresponding to the application without any conversion chemical or by reducing remarkably the need of the conversion chemical.

An object of the present invention is to reduce energy consumption, especially the use of steam.

An object of the present invention is to be able to use a higher dry substance and a lower viscosity of the surface size than before in the spray sizing station and in the surface sizing station, such as pond or film reel station.

An object of the present invention is to be able to manufacture the starch size in a higher dry matter content and in a lower viscosity than before.

An object of the present invention is to be able to manufacture the starch size more efficiently than before by not causing at least any negative big changes to the chemical structure of the starch or to the properties of the starch size.

An object of the present invention is to provide a starch size, which remains well fluid, i.e. does not return quickly gel-like.

An object of the present invention is to be able to disinfect the starch size and the starch slurry more efficiently than before.

BRIEF DESCRIPTION OF THE INVENTION

In order to achieve the above-mentioned objects, among others, the method and the apparatus according to the invention as well as other objects of the invention are characterized by what is presented in the enclosed independent claims, especially in their characterizing parts. Dependent claims present examples of the possible embodiments of the invention.

The application examples and advantages mentioned in this text are in suitable parts applicable both to the method and the apparatus according to the invention and to the uses of the invention and to other objects of the invention, even if this is not always specifically mentioned.

In a typical method according to the invention for continuous manufacture of surface sizing starch, wet-end starch or binder starch in paper, cardboard and chemical pulp industry the starch slurry is modified as a starch size suitable for the application by exposing the starch slurry to ultra sound in an ultrasonic unit.

A typical apparatus according to the invention for continuous manufacture of surface sizing starch, wet-end starch or binder starch in paper, cardboard and chemical pulp industry comprises a modification unit, which comprises at least one ultrasonic unit. The ultrasonic unit is arranged to expose the starch slurry to ultra sound and thus modify the starch slurry to a starch size suitable for the application.

The ultrasonic unit comprises at least one ultrasonic source, i.e. an ultrasonic element, near which or pass which the starch slurry is arranged to flow so that the energy produced by the ultrasonic source can be directed to the starch slurry flowing pass.

The ultrasonic element vibrates in a high frequency (for example over 20 kHz, over 30 kHz or over 40 kHz) and causes cavitation and small cavitation bubbles in the liquid, such as in the starch size or in the starch slurry. The movement of the ultrasonic element is short, for example over 10 or 10-300 micrometers. In some applications of the invention the reciprocating movement of the ultrasonic element, i.e. the amplitude of the ultrasonic source of the ultrasonic unit is at least 40 micrometers, at least 60 micrometers, 60-120 micrometers, over 60 micrometers, 61-120 micrometers.

The sources of ultra sound are known as such, and their operation is not presented here in more detail.

The apparatus according to the invention also comprises other parts, devices or elements required in a respective situation. Some possible parts of the apparatus are different connections, such as pipes, valves and pumps, with which the raw materials, the starch slurry and the starch size are transferred between the parts of the apparatus. Appropriate connections are needed for example for directing the modified finished starch size from the ultrasonic unit to the storage container or to the application. Different connections and other devices necessary in the processes are known as such, and they are not described in this text in more detail.

Now it has thus been found out that the starch slurry can be modified as a starch size suitable for an application by exposing the starch slurry to ultra sound. The ultrasonic modification is based on the ability of the ultra sound to accelerate the depolymerization by separating the amylopectin and amylose molecule chains from each other, whereby they form an amorphous gel phase. Thus, the interaction of the polymer molecules is decreased and results in the decrease of the viscosity of the solution. The ultrasonic modification, i.e. the ultrasonic conversion, does not, however, cause big changes to the chemical structure of the starch and especially not to the properties of the starch size.

For example potato, corn, tapioca, wheat or other corresponding native or modified starches are suitable to be used with the invention. Different flours, i.e. baking flours, such as potato, corn, tapioca, wheat or other corresponding grain flours or other flours to be used in the food industry, are suitable to be used with the invention. The baking flours can comprise additives, for example citric acid.

The invention can be utilized both for the modification of the starch slurry to be manufactured in situ as well as of the stored starch slurry. It is possible that the starch slurry is manufactured elsewhere, brought to the place for example in containers, and the modification is performed according to the invention. The finished starch size can be stored to wait for the use or the modification can be performed just before the application.

One way of describing some applications of the invention is that the starch to be used in the manufacture of surface sizing starch, wet-end starch or binder starch needed in paper, cardboard and chemical pulp industry and the products to be manufactured therefrom or the intermediate products, such as slurries, of the manufacturing process can be for example heated, gelatinized and modified with ultra sound.

As simplified, the gelatinization refers to the induration of the starch, as a result of which the starch slurry is gelled.

The application refers to the application of the starch size, such as for example to the feed system of the surface sizing, to the feed system of the wet end and to the manufacturing method of the coating.

Surface sizing starch refers to the starch to be used for the coating of the paper and the cardboard. The wet-end starch refers to the starch to be added to the pulp before the formation of the web in the manufacture of paper and cardboard. The binder starch refers to the starch to be used in the manufacture of the surface coating of the paper and the cardboard.

In an embodiment of the invention the ultrasonic unit has an overpressure over 0.5 bars, over 1 bar, 0.5-2.5 bars or 1-1.5 bars. During the ultrasonic treatment, the starch slurry can thus be exposed to an overpressure with respect to the normal atmospheric pressure.

One embodiment of the invention comprises a suspension unit, in which starch powder and water are mixed as a starch slurry.

The solids content of the starch slurry can be set as desired in the suspension unit by directing the material flows to be fed to the suspension unit. The desired solids content can be for example 3-45%, 5-45%, 3-28%.

For example native starch powder and water or modified starch powder and water can be mixed in the suspension unit. Modified starches are for example starches modified by hydrolysis, oxidation, etherification or esterification.

In an embodiment of the invention starch powder and water are mixed in the suspension unit with a mechanical mixer.

In an embodiment of the invention the starch slurry is directed from the suspension unit through the connections directly to the ultrasonic unit to be modified as a starch size.

In an embodiment of the invention the starch size is directed from the ultrasonic unit through the connections to the storage container or to the application in the paper, cardboard and chemical pulp industry.

An embodiment of the invention comprises a preheater, to which the starch slurry is arranged to be directed and from which the starch slurry can be directed to the ultrasonic unit. The preheater is for example continuous. In an embodiment the starch slurry is directed from the suspension unit to the continuous preheater, in which the starch slurry is heated with steam to the desired preheating temperature. The preheated starch slurry can be directed for modification for example to an ultrasonic unit according to the invention.

In an embodiment of the invention the apparatus, for example the ultrasonic unit, according to the invention comprises means for controlling the heating capacity of the preheater. In an embodiment of the invention the starch slurry is gelatinized, i.e. heated over its so-called gel point, i.e. for example to the temperature of 35-95 degrees Celsius, 35-70 degrees Celsius, 45-70 degrees Celsius or 45-60 degrees Celsius. The preheater can be for example a steam operated, for example a jet-type, ultrasonic unit, or an ultrasonic unit according to the invention.

In an embodiment of the invention the starch slurry is directed from the suspension unit to the first ultrasonic unit, in which the starch slurry is gelatinized, i.e. heated over its gel point by exposing the starch slurry to ultra sound. The heated starch slurry can be directed from the first ultrasonic unit through the connections to the second ultrasonic unit. The starch slurry is modified as a starch size suitable for the application by exposing the starch slurry to ultra sound in said second ultrasonic unit.

In an embodiment of the invention the starch slurry is directed from the suspension unit to the first ultrasonic unit, in which the starch slurry is exposed to ultra sound. From the first ultrasonic unit the starch slurry is directed to the continuous preheater, in which the starch slurry is heated with steam to the desired preheating temperature. From the continuous preheater the starch slurry is directed to the second ultrasonic unit. The starch slurry preheated in the second ultrasonic unit is modified as a starch size suitable for the application by exposing the preheated starch slurry to ultra sound.

An embodiment of the invention comprises a continuous preheater, in which the starch slurry is arranged to be heated with steam in a desired temperature and dry matter content so that the starch slurry is modified as a starch size. The modified starch size is directed through the connections to the storage container. From the storage container the starch size is directed to the ultrasonic unit, in which it is further modified as a starch size suitable for the application by exposing the starch size to ultra sound.

In an embodiment of the invention the starch slurry is modified as a starch size suitable for the application entirely without any conversion chemical.

In an embodiment of the invention, in addition to starch powder and water a desired amount of one or more of the following:
lignosulphonate powder or solution;
chitosan powder or solution;
maltodextrine powder or solution;
chemical additives,
are mixed to the starch slurry in the suspension unit.

Chemical additives can be for example APS, i.e. ammonium persulphate, different enzymes, optical brightener, colours, hydrogen peroxide, copper sulphate, lye.

In an embodiment of the invention the dry matter content of the starch size is arranged as desired by mixing therein water after the ultrasonic treatment, but before directing it to the storage container or to the application. Thus, the apparatus comprises means for adding and mixing water to the starch size after the ultrasonic treatment, but before the storage container or the application.

In an embodiment of the invention the apparatus, for example the ultrasonic unit, according to the invention comprises one or more of the following:
a measurement device of the viscosity and/or the temperature of the starch slurry and/or the starch size a pump for controlling the flow rate of the starch slurry and/or the starch size means for controlling the performance and/or the amplitude of the ultrasonic source of the ultrasonic unit.

In an embodiment of the invention the viscosity and/or the temperature of the starch slurry and/or starch size are measured after the ultrasonic unit. The apparatus comprises a measurement device for the viscosity and/or the temperature of the starch slurry and/or the starch size. The control devices, which control one or more of the following variables:

the flow rate of the starch slurry and/or the starch size,
the heating effect of the preheater,
the performance of the ultrasonic source of the ultrasonic unit
the amplitude of the ultrasonic source of the ultrasonic unit, are controlled based on the measurements.

With the aid of said variables, the viscosity of the starch size can be optimized in relation to the dry matter content of the starch size with optimizing devices, such as for example with a computer and a programme to be run in it.

In an embodiment of the invention the ultrasonic unit comprises a flow-through container, i.e. a container, through or in which the starch slurry is arranged to flow. The ultrasonic source is thus installed inside the flow-through container or in connection with it, so that the starch slurry flowing in the container or through the container gets under the influence of the ultra sound.

In an embodiment of the invention the ultrasonic unit comprises a continuous ultrasonic apparatus. In an embodiment of the invention one ultrasonic unit contains several ultrasonic sources connected parallel and/or in series with respect to the flow of the starch slurry.

The methods and apparatuses of the invention are suitable to be used for example in a spray coating station, curtain coating station or in a surface sizing station, such as in a pond or film reel station or blade coating station.

One big advantage and possible embodiment of the invention is the ability of the ultrasonic treatment according to the embodiments disclosed in this application to disinfect, i.e. pasteurize the starch slurry and the starch size to be manufactured therefrom. The disinfection is thought to result from the fact that when the bubbles generated by the ultra sound burst, locally high temperatures and pressures (temperatures of maybe over 1000, even 5000 degrees Celsius and pressure of maybe over 500, even 2000 atm) are caused to the material to be treated. So-called micro jets and hot spots to be developed thus break the cell walls of the microorganisms, whereby the starch slurry is disinfected. Each or only some or one of the ultrasonic treatments disclosed in this application can be disinfective.

BRIEF DESCRIPTION OF THE FIGURES

The invention is described in more detail below with reference to the enclosed schematic drawing, in which.

DETAILED DESCRIPTION OF THE EXAMPLES OF THE FIGURES

Figure 1:
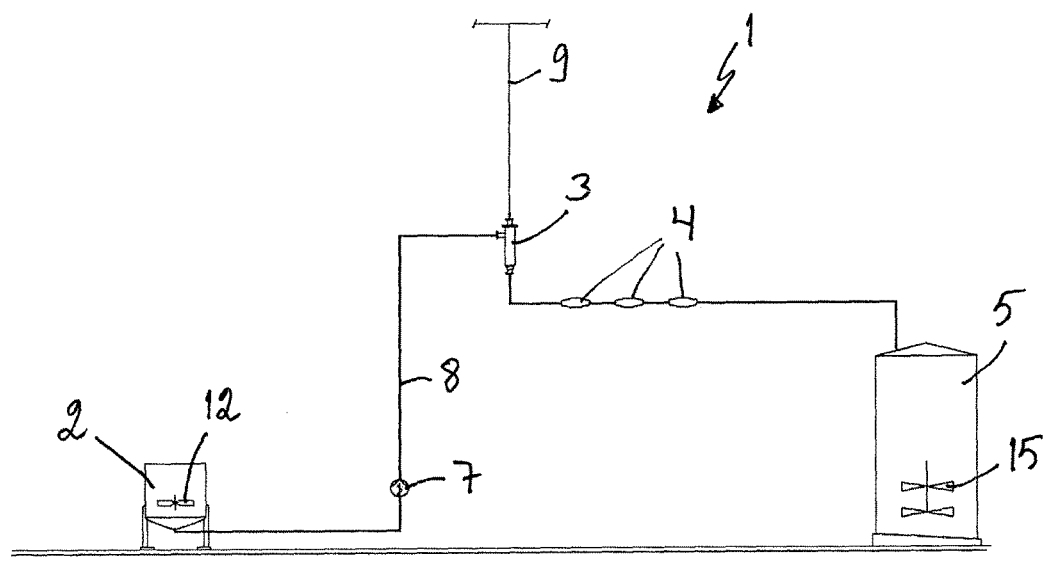
FIG. 1 shows a solution according to the invention for modifying the gelatinized starch with ultra sound.

For the sake of clarity, in different embodiments same reference numerals are used for parts corresponding to each other.

FIG. 1 shows an apparatus 1 according to the invention for modifying the gelatinized starch with ultra sound. The starch slurry is directed from the suspension unit 2 to the continuous preheater 3, in which the starch slurry is heated for example with steam or warm water and heat exchanger to a desired preheating temperature. The preheated starch slurry is directed to be modified in the ultrasonic unit 4. From the ultrasonic unit 4 the finished starch size is directed to the storage container 5 to wait for the final use. Three separate ultrasonic sources, a necessary amount of which can be present respectively, have been drawn to the ultrasonic unit 4 of FIG. 1.

Figure 2:
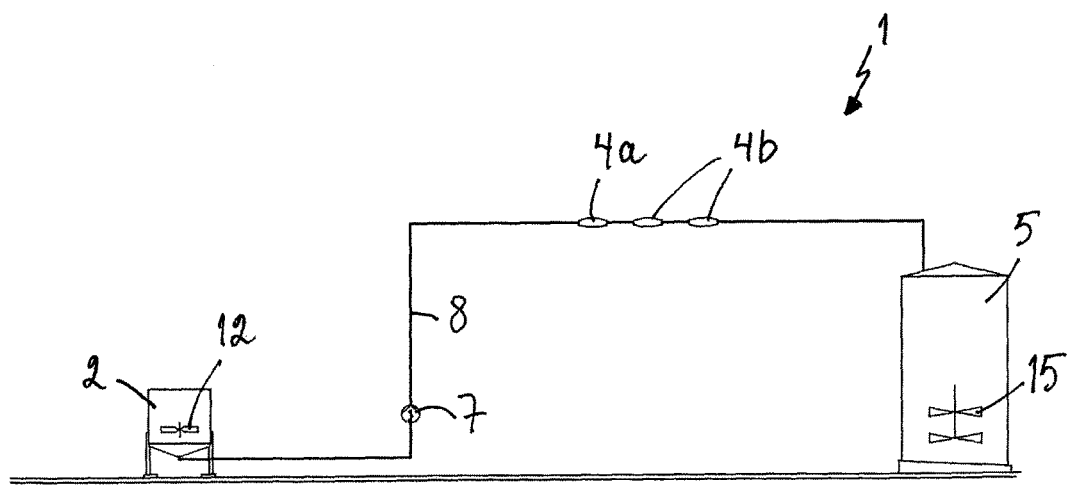
FIG. 2 shows a solution according to the invention for gelatinizing and modifying the starch slurry with ultra sound.

FIG. 2 shows an apparatus 1 according to the invention for gelatinizing and modifying the starch slurry with ultra sound. The starch slurry is directed from the suspension unit 2 to the first ultrasonic unit 4a, in which the starch slurry is gelatinized, i.e. heated over its gel point by exposing the starch slurry to ultra sound. From the first ultrasonic unit 4a the heated starch slurry is directed through the connections to two second ultrasonic units 4b connected in series. The starch slurry is modified as a starch size suitable for the application by exposing the starch slurry to ultra sound in said second ultrasonic units 4b. From the ultrasonic units 4b the finished starch size is directed to the storage container 5 to wait for the final use. One separate ultrasonic source has been drawn to the ultrasonic unit 4a and two separate ultrasonic sources have been drawn to the ultrasonic unit 4b, a necessary number of thereof can be present respectively.

Figure 3:
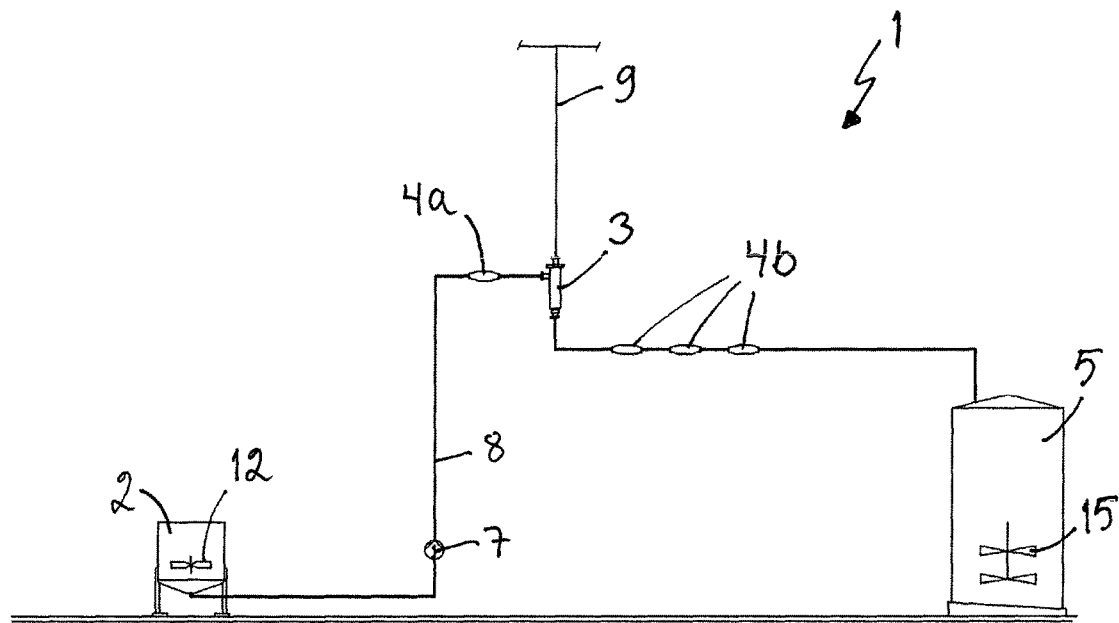
FIG. 3 shows a solution according to the invention for gelatinizing the starch slurry with ultra sound and steam and for modifying with ultra sound.

FIG. 3 shows an apparatus 1 according to the invention for gelatinizing the starch slurry with ultra sound and steam and for modifying with ultra sound. The starch slurry is directed from the suspension unit 2 to the first ultrasonic unit 4a, in which the starch slurry is exposed to ultra sound. From the first ultrasonic unit 4a the starch slurry is directed to a continuous preheater 3, in which the starch slurry is heated with steam to a desired preheating temperature. From the continuous preheater 3 the gelatinized starch slurry is directed to second ultrasonic units 4b, the number of which in this example is three connected in series. In the second ultrasonic units 4b the preheated starch slurry is modified as a starch size suitable for the application by exposing the starch slurry to ultra sound. From the ultrasonic units 4b the finished starch size is directed to the storage container 5 to wait for the final use.

Figure 4:
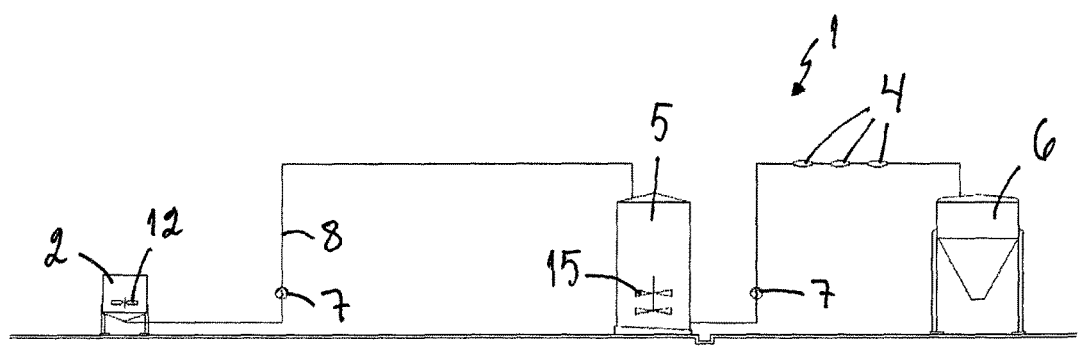
FIG. 4 shows a solution according to the invention for modifying the starch size with ultra sound.

FIG. 4 shows an apparatus according to the invention for modifying the starch size with ultra sound. The starch slurry is directed from the suspension unit 2 to the storage container 5. From the storage container 5 the starch slurry is directed to three ultrasonic units 4 connected in series. In the ultrasonic units 4 the starch slurry is modified as a starch size suitable for the application by exposing the starch slurry to ultra sound. In the example of FIG. 4 the starch slurry is directed from the ultrasonic units 4 to the application 6, for example to the service container of the spray coating station or the surface sizing station, such as pond or film reel station.

In some embodiments of the invention no suspension unit 2 is needed, but the starch slurry can already be ready dissolved or gelatinized or modified. Such starch slurry can be directed to the ultrasonic unit 4 to be modified as a starch size suitable for the application and further to the storage container or to the application.

All the ultrasonic units of the examples can disinfect the starch slurry or starch size.

In the Figures, some pumps 7 and pipes 8, steam inlet connections 9 and mechanical mixers 12 and 15 have been drawn to the suspension units and to the storage containers. It is obvious, that in order to operate, the finished apparatus may also need other devices known as such, for example valves and sensors. For example all the containers 2 and 5 can comprise heating devices for heating their content to the desired temperature.

Depending on the starch size capacity, one, two or more apparatuses shown in the Figures can be installed in parallel.

Figure 5:
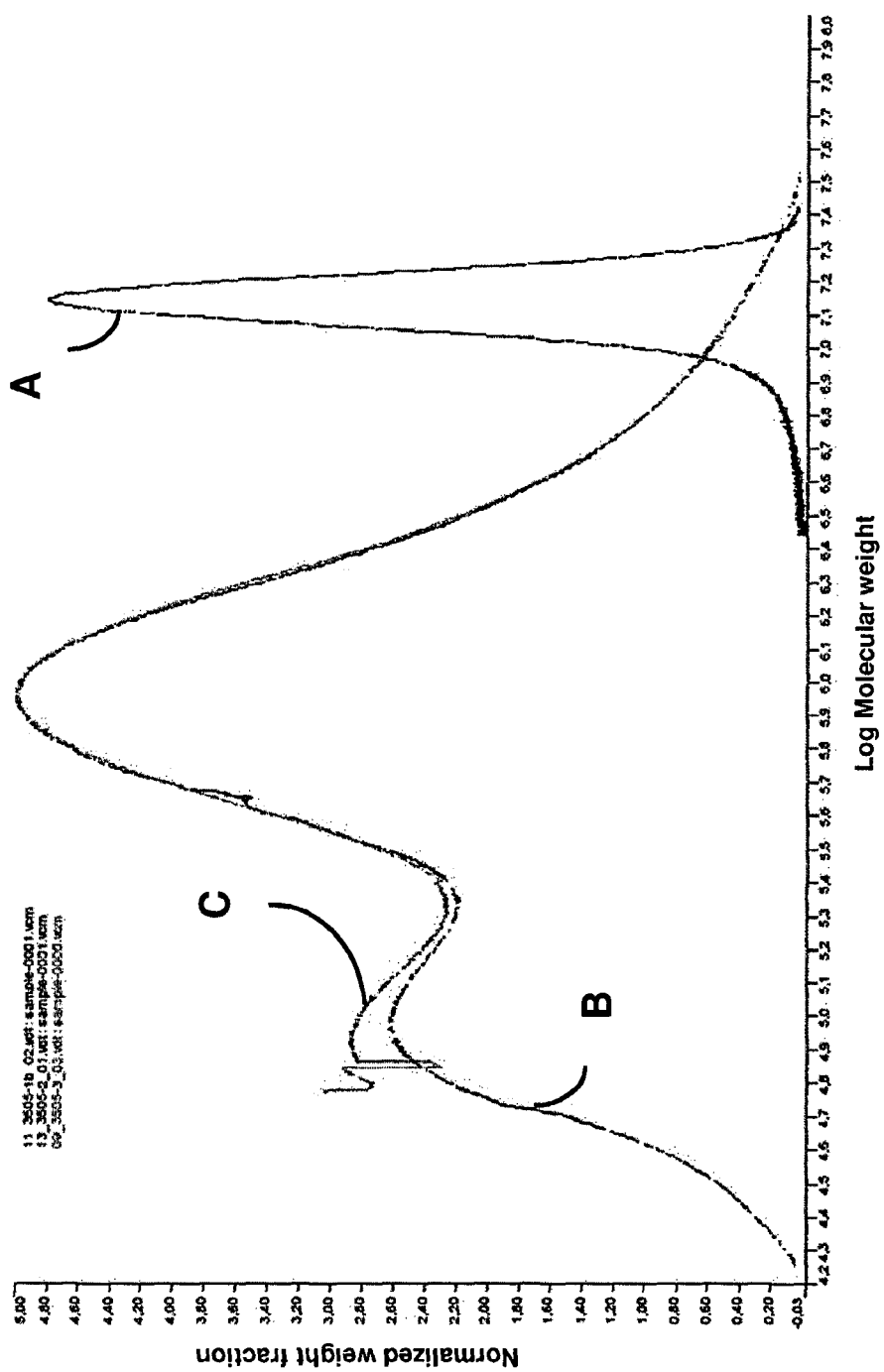
FIG. 5 shows a molecular weigh distribution of different starch samples.

FIG. 5 shows a graph, in which the molecule weight distributions of the three different starch samples are shown. In the Figure, the starches are the following:

A. Native starch as a raw material, which native starch has been treated with an ultrasonic treatment according to the invention.

B. Modified starch as a raw material, which modified starch has been treated with an ultrasonic treatment according to the invention.

C. Modified starch as a raw material, which modified starch has been cooked by a so-called normal cooking.

From the test results of FIG. 5 it can be seen, how the normal cooking C and the ultrasonic treatment B give approximately the same result for the modified starch.

The great deviation of the molecule weight indicates that the starch chains have broken in the modification already before the cooking and the ultrasonic treatment. Instead, in the native starch A treated with the ultra sound, the starch chains have remained long and the deviation of the molecule weight is small. The use of the enzymes in the treatment of the native starch can probably be decreased with the invention. In further tests it has been stated that the viscosity of the modified starch B treated with ultra sound is lower than the viscosity of the modified starch C treated with normal cooking (this is not shown in this Figure).

It is not intended to limit the scope of the invention to the examples mentioned in the application, but the scope is defined by the independent claims.

The invention claimed is:

1. A method for continuous manufacture of a starch size for an end-use application, wherein in the method comprises the steps of:
   (a) continuously passing a starch slurry through a preheater to form a preheated starch slurry;
   (b) continuously modifying the preheated starch slurry by exposing the preheated starch slurry to ultra sound in an ultrasonic unit to thereby modify the preheated starch slurry to obtain a starch size suitable for an end-use application;
   (c) continuously measuring viscosity and/or temperature of the starch slurry and/or the starch size; and
   (d) controlling at least one variable to optimize the viscosity of the starch size in relation to dry matter content of the starch size, wherein the at least one variable is selected from the group of variables consisting of (i) flow rate of the starch slurry and/or the starch size, (ii) heating effect of the preheater, (iii) performance of an ultrasonic source of the ultrasonic unit and (iv) amplitude of an ultrasonic source of the ultrasonic unit.

2. The method according to claim 1, wherein the method further comprises the steps of:
   (a1) prior to step a, mixing a starch powder and water in a suspension unit to form a starch slurry of suspended starch powder in water having a desired solids content; and
   (b1) after step (b),
   directing the starch size from the ultrasonic unit to a downstream storage container or to a downstream unit operation of the end-use application.

3. The method according to claim 2, wherein
   step (a1) is practiced by continuously directing the starch slurry from the suspension unit to the preheater and wherein step (a) is practiced by (i) steam-heating the starch slurry within the preheater to form the preheated starch slurry having a desired preheating temperature; and
   thereafter (ii) continuously directing the preheated starch slurry from the preheater to the ultrasonic unit.

4. The method according to claim 2, wherein
   wherein step (a) is practiced by continuously directing the preheated starch slurry to a first ultrasonic unit and wherein
   step (b) is practiced by:
   (i) heating the starch slurry in the first ultrasonic; unit over a gel point of the starch slurry by exposing the starch slurry to ultra sound to form a heated starch slurry;
   (ii) continuously transferring the heated starch slurry from the first ultrasonic unit to a second ultrasonic unit; and
   (iii) modifying the heated starch slurry to form the starch size suitable for the end-use application by exposing the heated starch slurry to ultra sound in the second ultrasonic unit.

5. The method according to claim 2, wherein
   (a1) comprises:
   (i) continuously directing the starch slurry from the suspension unit to a first ultrasonic unit;
   (ii) exposing the starch slurry to ultra sound in the first ultrasonic unit; and
   (iii) continuously directing the starch slurry from the first ultrasonic unit to the preheater and steam-heating the starch slurry to a desired preheating temperature in the preheater to form a preheated starch slurry; and wherein step (a) comprises continuously transferring the preheated starch slurry from the preheater to a second ultrasonic unit; and modifying the preheated starch slurry to form the starch size suitable for the end-use application by exposing the preheated starch slurry to ultra sound in the second ultrasonic unit.

6. The method according to claim 2, wherein step (a1) comprises mixing native starch powder and water in the suspension unit.

7. The method according to claim 2, wherein step (a1) comprising mixing modified starch powder and water in the suspension unit.

8. The method according to claim 2, wherein step (a1) comprises mixing starch powder and water a mechanical mixer in the suspension unit.

9. The method according to claim 1, wherein the method comprises modifying the starch slurry to form the starch size suitable for the end-use application entirely in the absence of any conversion chemical.

10. The method according to claim 2, wherein step (a1) comprises forming the starch slurry in the suspension unit by mixing a starch powder and water in addition to at least one further slurry component selected from the group consisting of lignosulphonate powder or solution; chitosan powder or solution; maltodextrine powder or solution; and chemical additives.

11. The method according to claim 1, wherein the method further comprises obtaining the dry matter content of the starch size by mixing water with the starch size after the ultrasonic unit before directing the starch size to a downstream storage container or to a unit operation of the end-use application.

12. A method for continuous manufacture of starch size for an end-use application, wherein the method comprises continuously modifying a starch slurry to form a starch size suitable for the end-use application by exposing the starch slurry in an ultrasonic unit having an ultrasonic source which is vibrated with an amplitude of at least 40 micrometers.

13. The method according to claim 12, which further comprises continuously passing the starch slurry through a preheater to form a preheated starch slurry, and directing the preheated starch slurry to the ultrasonic unit.

14. The method according to claim 13, which comprises steam-heating the starch slurry in the preheater to form the preheated starch slurry.

15. The method according to claim 12, which comprises the steps of:
   (a) continuously measuring viscosity and/or temperature of the starch slurry and/or the starch size after the ultrasonic unit; and
   (b) controlling at least one variable to optimize the viscosity of the starch size in relation to dry matter content of the starch size, wherein the at least one variable is selected from the group of variables consisting of (i) flow rate of the starch slurry and/or the starch size, (ii) heating effect of the preheater, (iii) performance of an ultrasonic source of the ultrasonic unit and (iv) amplitude of an ultrasonic source of the ultrasonic unit.

16. The method according to claim 12, which further comprises:
   mixing a starch powder and water in a suspension unit to form a starch slurry of suspended starch powder in water having a desired solids content;
   directing the starch slurry to the ultrasonic unit to form the starch size; and
   directing the starch size from the ultrasonic unit to a downstream storage container or to a downstream unit operation of the end-use application.

17. The method according to claim 16, which further comprises:
   continuously directing the starch slurry from the suspension unit to a preheater and steam-heating the starch slurry within the preheater to form a preheated starch slurry having a desired preheating temperature; and
   continuously directing the preheated starch slurry from the preheater to the ultrasonic unit.

18. The method according to claim 16, which further comprises: continuously directing the starch slurry from the suspension unit to a first ultrasonic unit;
   heating the starch slurry in the first ultrasonic unit over a gel point of the starch slurry by exposing the starch slurry to ultra sound to form a heated starch slurry;
   continuously transferring the heated starch slurry from the first ultrasonic unit to a second ultrasonic unit having an ultrasonic source which is vibrated with the amplitude of at least 40 micrometers; and modifying the heated starch slurry to form the starch size suitable for the end-use application by exposing the heated starch slurry to ultra sound in the second ultrasonic unit.

19. The method according to claim 16, which further comprises: continuously directing the starch slurry from the suspension unit to a first ultrasonic unit;
   exposing the starch slurry to ultra sound in the first ultrasonic unit; continuously directing the starch slurry from the first ultrasonic unit to a preheater and steam-heating the starch slurry to a desired preheating temperature in the preheater to form a preheated starch slurry; continuously transferring the preheated starch slurry from the preheater to a second ultrasonic unit having an ultrasonic source which is vibrated with the amplitude of at least 40 micrometers; and modifying the preheated starch slurry to form the starch size suitable for the end-use application by exposing the preheated starch slurry to ultra sound in the second ultrasonic unit.

20. The method according to claim 16, which comprises mixing native starch powder and water in the suspension unit.

21. The method according to claim 16, which comprises mixing modified starch powder and water in the suspension unit.

22. The method according to claim 16, which comprises mixing starch powder and water with a mechanical mixer in the suspension unit.

23. The method according to claim 12, wherein the method comprises modifying the starch slurry to form the starch size suitable for the end-use application entirely in the absence of any conversion chemical.

24. The method according to claim 16, wherein the method comprises forming the starch slurry in the suspension unit by mixing a starch powder and water in addition to at least one further slurry component selected from the group consisting of lignosulphonate powder or solution, chitosan powder or solution, maltodextrine powder or solution, and chemical additives.

25. The method according to claim 12, which further comprises obtaining a desired dry matter content of the starch size by mixing water with the starch size after the ultrasonic unit before directing the starch size to a downstream storage container or to a unit operation of the end-use application.

26. The method according to claim 1 or 12, wherein the starch size is a wet end or binder starch for an end-use application which is one selected from the group consisting of the paper industry, the cardboard industry and the chemical industry.

* * * * *